ised Patent [19]

United States Patent [19]

Wing et al.

[11] 4,281,708
[45] Aug. 4, 1981

[54] AUTOMATIC THERMAL SWITCH

[75] Inventors: Lawrence D. Wing, Bowie; Joseph W. Cunningham, Rockville, both of Md.

[73] Assignee: The United States of America as represented by the Administrator of the National Aeronautics and Space Administration, Washington, D.C.

[21] Appl. No.: 43,943

[22] Filed: May 30, 1979

[51] Int. Cl.³ ............................................. F28F 27/00
[52] U.S. Cl. ........................................ 165/32; 62/383
[58] Field of Search ........................... 165/32, 96, 105; 236/1 R; 62/383

[56] References Cited

U.S. PATENT DOCUMENTS

| 3,229,755 | 1/1966 | Komarow | 236/1 |
| 3,399,717 | 9/1968 | Cline | 165/32 |
| 3,430,455 | 3/1969 | Stuart et al. | 62/383 |
| 3,478,819 | 11/1969 | Reinke | 165/96 |
| 3,502,138 | 3/1970 | Shlosinger | 165/32 |
| 3,717,201 | 2/1973 | Hosmer et al. | 62/383 |
| 3,957,107 | 5/1976 | Altoz et al. | 165/32 |

OTHER PUBLICATIONS

Martin-Marietta Publication, "Viking Mars Surface Thermal Control", (pp. TS 4-16 incl.) (5 shts. Dwg., 3 shts. Spec.).

Primary Examiner—Samuel Scott
Assistant Examiner—Theophil W. Streule, Jr.
Attorney, Agent, or Firm—John O. Tresansky; John R. Manning; Robert D. Marchant

[57] ABSTRACT

An automatic thermal switch to control heat flow includes a first thermally conductive plate, a second thermally conductive plate and a thermal transfer plate pivotally mounted between the first and second plates. A phase-change power unit, including a plunger connected to the transfer plate, is in thermal contact with the first thermally conductive plate. A biasing element, connected to the transfer plate, biases the transfer plate in a predetermined position with respect to the first and second plates. When the phase-change power unit is actuated by an increase in heat transmitted through the first plate, the plunger extends and pivots the transfer plate to vary the thermal conduction between the first and second plates through the transfer plate. The biasing element, transfer plate and piston can be arranged to provide either a normally closed or normally open thermally conductive path between the first and second plates.

18 Claims, 4 Drawing Figures

AUTOMATIC THERMAL SWITCH

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The present invention relates to thermal switches and more particularly to an automatic thermal switch having a pivoting thermal transfer plate.

In many areas of modern technology, such as cryogenic refrigeration, spacecraft, and electronics, it is desirable to control the flow of heat from one area or object to another. For example, in space vehicles it is often necessary to absorb or reject heat from the environment to achieve a desired thermal control over temperature sensitive items (e.g. semiconductor circuitry) in a payload. A direct and fixed heat path between the environment and items is often not acceptable because when the spacecraft field of view is full sun, the amount of heat flow to the items can be so great that the items are destroyed. Similarly, when the spacecraft field of view is deep space, the loss of heat, by black body radiation, from the items can be so large that the items become inoperative.

Two common prior art devices used for thermal control in spacecraft are louvers or an opening and closing cover plate (lid). The exposed surface of either the louvers or the cover plate has, for example, a low absorptivity, high emissivity surface coating which rejects incoming radiation from the sun and enhances the heat radiated from the surface, effectively preventing overheating of a heat-producing, temperature sensitive payload item. The louvers or lid are opened to expose a radiating plate having a low emissivity to space when the spacecraft field of view is deep space. In this way, the internally produced heat can be rejected, but in a controlled manner, such that the payload item does not get excessively cold. Both the lid and louver system are analogous to providing a surface with variable absorption and emission properties.

The chief disadvantage of the lid or louver systems is that they are susceptible to physical damage because they must be affixed to an exterior spacecraft surface. Another disadvantage lies in the magnitude of mechanical motion involved with opening and closing the louvers or lid which produces unwanted force reactions and tends to increase the probability of improper or incomplete functioning. A third disadvantage is that there is still some radiative heat loss from the louvered system when exposed to deep space which necessitates the use of on-board heaters to maintain equipment at operating temperatures. Finally, the need for lids or louvers which cover the entire radiating surface area often results in a system which is heavier than an equivalent number of thermal switches.

Thermal switches have been proposed to vary the thermal conductivity or rate of heat transfer between one area or object and another. One such thermal switch is in contact with a cold plate and includes a sealed extendible bellows containing a flexible wick and a thermally conductive plate carried by the bellows. Freon is encased within the bellows which, along with the flexible wick, acts as a heat pipe. Heat from the cold plate is transmitted to the Freon which evaporates and causes the bellows to expand. The expansion of the bellows causes the conductive plate to contact a hot plate so that heat is transferred between the plates.

Another type of thermal switch includes a thermal actuator in contact with a sensor block. A piston extends from the actuator into a cup in a heat sink. The piston is biased by a pair of springs to keep the piston from contacting the heat sink during normal operation. Heat transferred to the actuator from the sensor block causes the piston to extend into the cup and contact the heat sink while compressing the springs. Thus, heat can flow between the heat sink and sensor block.

Another prior art type of thermal switch variably conducts heat between a heat source plate and a heat sink plate. A plurality of bellows are attached to the heat source plate through conductive spacers. The bellows contain an expandable fluid and carry a thermally conductive plate which is disposed between the two plates. As the heat source temperature rises, the fluid within the bellows expands to cause the thermally conductive plate to contact the heat sink plate so that heat is transferred between the plates.

However, such prior art thermal switches have proved to be unreliable in operation in high vibration environments such as spacecraft, and uneconomical to produce in any large quantities because of their complexity. In addition, such thermal switches have heretofore been of the normally "open" type (low thermal conductivity), with a heat path being provided between a pair of plates only when it is desired to have a "closed" (high thermal conductivity) heat path.

Accordingly, an object of the invention is to provide a new automatic thermal switch that is simple and reliable.

It is further object of this invention to provide an automatic thermal switch that produces relatively small force reactions.

It is still a further object of this invention to provide an automatic thermal switch that effectively controls heat dissipation.

It is an additional object of the invention to provide an automatic thermal switch that is relatively lightweight.

It is another object of this invention to provide an automatic thermal switch which is substantially unaffected by vibration.

It is still an additional object of the invention to provide an automatic thermal switch which can be arranged to provide a low thermal conductive heat path or a high thermal conductive heat path.

It is a further object of this invention to provide a plurality of thermal switches that selectively provide a desired amount of thermal conductivity between two areas.

It is yet another object of the invention to provide automatic thermal switches that control heat flow between a pressurized equipment compartment and the outer skin of a spacecraft.

SUMMARY OF THE INVENTION

These and other objects are achieved with a thermal switch including first and second spaced thermally conductive plates, and a heat motor having a thermally conductive armature, the heat motor being responsive to thermal energy to drive the armature and vary the heat transfer between the first and second plates. The heat motor is connected to the armature and is in a heat exchange relationship with the first conductive plate. A biasing element, such as a spring, is connected to the armature to bias the armature in a predetermined position with respect to the first and second plates. The heat engine is actuated by a net change in heat transferred between the first and second plates. In one embodiment, the biasing element normally biases the armature into thermal contact with the first and second plates. The heat motor drives the armature into a non-contacting position with respect to the first and second plates in response to net heat gain by the first plate. In a second embodiment, the biasing element normally biases the armature into a non-contacting position with respect to the first and second plates. The heat motor drives the armature into thermal contact with the first and second plates in response to net heat gain by the first plate.

The thermal switches of the present invention are simpler and more reliable than prior art thermal switches, especially when used in high vibration environments such as spacecraft, because the spring biased armature automatically accommodates relative motion between the first and second plates. The thermal switches can be manufactured in either a normally open or a normally closed version; either type of switch is completely automatic in operation since each switch includes a self-contained power source (heat motor). The thermal switches can be varied in size, number and arrangement according to the amount of thermal conduction required between the first and second plates. In addition, when used in spacecraft to control heat flow between an equipment bay and the spacecraft skin, the thermal switches can be placed between a pressurized equipment bay and the spacecraft skin. Hence, there is no need to expose the equipment bay or the contents to a vacuum, as occurred in the prior art when louvers were used to control the equipment bay temperature.

Other objects, features and advantages of the invention are presented in the following detailed description of the invention taken in conjunction with the accompanying drawings.

BRIEF DESCRIPTION OF THE DRAWINGS

In the drawings where like parts are designated by the same references.

DESCRIPTION OF THE PREFERRED EMBODIMENTS

Figure 1:
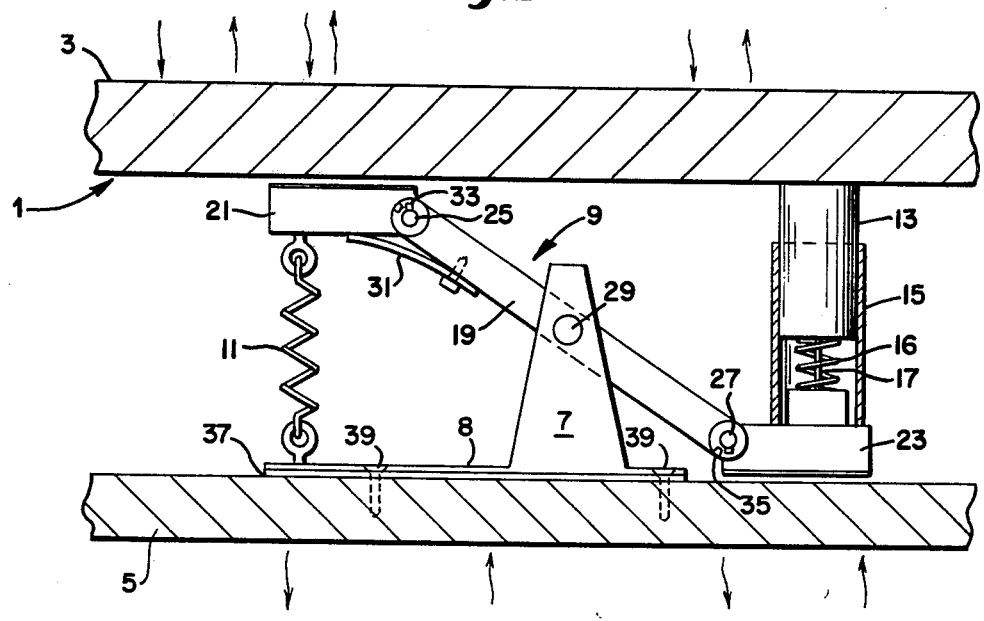
FIG. 1 is a side view of one embodiment of the thermal switch employing the principles of the present invention.

In FIG. 1 there is illustrated one embodiment of a thermal switch, generally designated by numeral 1, constructed according to the principles of the present invention. Switch 1 comprises a first thermally conductive plate 3, a second thermally conductive plate 5, a frame or support 7 disposed between the first and second plates and mounted to the second plate 5, and an armature, generally designated by numeral 9, pivotally mounted to support 7. Plates 3 and 5 have surfaces which are respectively exposed to uncontrolled and controlled temperature environments. A biasing device such as spring 11 is used to bias armature 9 in a predetermined position with respect to the first and second plates. Spring 11 biases armature 9 in a normally non-contacting position with respect to the first and second plates. Spring 11 also biases armature 9 into contacting engagement with a heat motor device 13. Heat motor 13 preferably comprises a phase-change piston-type power unit which slidingly interfits within a brass tube 15 mounted to one end of armature 9. One end of power unit 13 is in thermal contact with plate 3 to place the power unit 13 in a heat exchange relationship with the uncontrolled environment. The other end of power unit 13 includes a plunger 17 which is connected to one end of armature 9. A compression spring 16 is disposed between the lower portion of the power unit 13 and armature 9. Spring 16 provides an upwardly directed force to keep the upper end of power unit 13 thermally engaged with plate 3 at all times.

Armature 9 comprises an articulated thermally conductive heat transfer plate having a thermally conductive central section 19, an upper end portion 21 and a lower end portion 23. End portions 21 and 23 are connected to central section 19 by a pair of hinges 25 and 27. The armature further includes a pair of pivot pins 29 attached to central section 19 for mounting the articulated armature 9 to support 7 through openings formed in the support. A positioning spring 31, attached to central portion 19 of armature 9, maintains the upper face of end portion 21 substantially parallel to plate 3. Hinges 25 and 27 each include lug stops 33 and 35 to prevent end portions 21 and 23 of armature 9 from moving more than ten degrees above or below the horizontal.

Baseplate 8 of support 7 rests on a sheet of thermally insulative material 37, such as neoprene rubber, and is attached to plate 5 by a number of machine screws or bolts 39. Support 7 can be formed from a wide variety of materials, including stainless steel. Tension spring 11 is attached between baseplate 8 of support 7 and the end portion 21 of armature 9.

Armature 9, and plates 3 and 5, each can be made of a wide variety of materials, with materials of high thermal conductivity, such as copper and aluminum, being preferred.

The phase-change power unit 13 is a type well known in the art. Such devices include an internal reservoir containing a fluid which undergoes a phase change from liquid to gas at a temperature particular to the fluid. For example, the phase change fluid may be ammonia, Freon, or deionized water. Normally such materials are maintained in a fluid state within the power unit. Heat transferred from plate 3 to power unit 13 causes the phase-change material to undergo a phase change from liquid to gas, which in turn causes piston-carried plunger 17 to be extended.

The embodiment of the invention illustrated in FIG. 1 provides a normally "open" (low thermal conduction) path between plates 3 and 5. Spring 11 biases armature 9 into a normally non-conducting position with respect to plates 3 and 5. So long as plate 3 remains below the phase-change temperature of power unit 13, plunger 17 is fully retracted. The bias applied to armature 9 by spring 11 also maintains plunger 17 in a fully retracted position against the weaker pressure of compression spring 16.

When the temperature of plate 3 rises above the phase-change temperature of the power unit (through exposure to a heat source such as the sun) the fluid contained within the power unit undergoes a phase-change to cause plunger 17 to extend. Plunger 17 applies a force to portion 23 of the transfer plate of armature 9 causing central section 19 to pivot against the bias pressure applied by spring 11. When plunger 17 is fully extended, portions 21 and 23 of armature 9 contact plates 3 and 5, respectively. Because plates 3, 5 and the transfer plate of armature 9 are made of thermally conductive materials, heat transfer occurs from the first plate 3 to the second plate 5 through armature 9. The contacting faces of end portions 21 and 23 and hinges 25, 27 include a layer of thermal grease to enhance thermal conductivity.

When the temperature of plate 3 drops below the phase-change temperature of power unit 13, plunger 17 retracts due to the pressure applied by spring 11 through armature 9. Thermal contact between the transfer plate of armature 9 and plates 3 and 5 is then broken, resulting in little or no heat transfer between plates 3 and 5.

Figure 2:
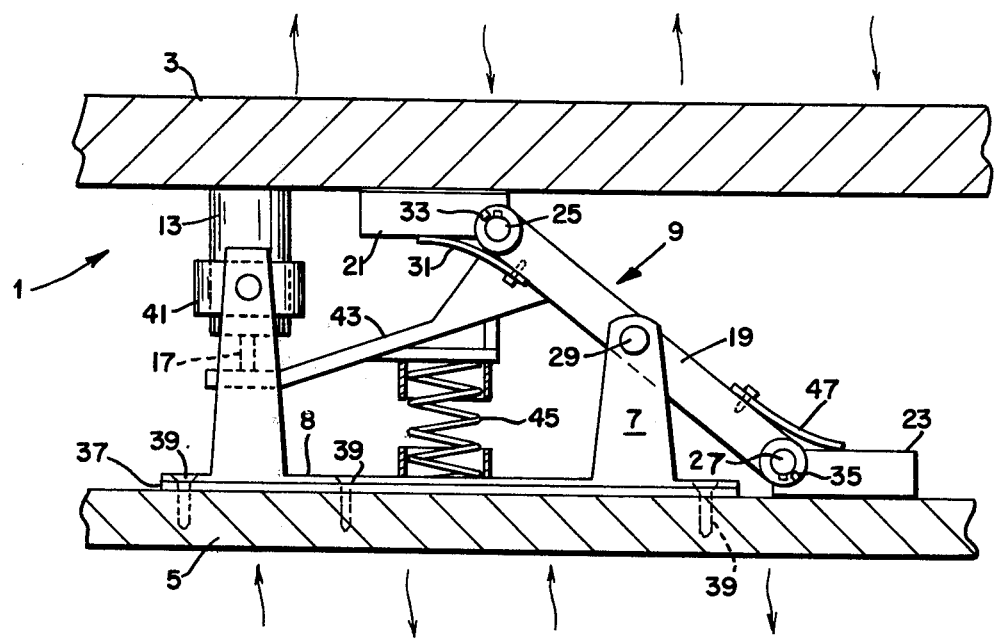
FIG. 2 is a side view of an alternate embodiment of the thermal switch.

A second embodiment of the invention is shown in FIG. 2. In this embodiment thermal switch 1 is designed to provide a normally "closed" (high thermal conduction) path between plates 3 and 5. The arrangement of elements is similar to that of FIG. 1 with the exception that armature 9 includes an arm 43 attached to central section 19 thereof, and a compression spring 45 mounted to plate 5 and attached to arm 43 for biasing the thermal transfer plate of armature 9 into thermal contact with plates 3 and 5. A portion of arm 43 is connected to power unit 13. A positioner spring 47, similar to spring 31 described above, is mounted to central portion 19 of armature 9 to maintain the contacting face of end portion 23 in a substantially parallel position with respect to plate 5.

The transfer plate of armature 9 is biased into thermal contact with plates 3 and 5 by the spring pressure applied by spring 45 to arm 43. The biasing pressure applied to arm 43 also maintains plunger 17 of power unit 13 in a fully retracted position. When the heat transferred from plate 3 to power unit 13 reaches the phase-change temperature of the power unit, plunger 17 is extended. As plunger 17 extends, it exerts a pressure on arm 43, and thence central section 19, to counter the pressure of spring 45 to cause the transfer plate of armature 9 to pivot. When plunger 17 is fully extended, the thermal path between the transfer plate of armature 9 and plates 3 and 5 is broken.

Whenever the temperature of plate 3 drops below the phase-change temperature of power unit 13, plunger 17 retracts under pressure applied by spring 45 through arm 43 causing the transfer plate of armature 9 to pivot back into thermal contact with plates 3 and 5 to re-establish a thermal path therebetween.

Figure 4:
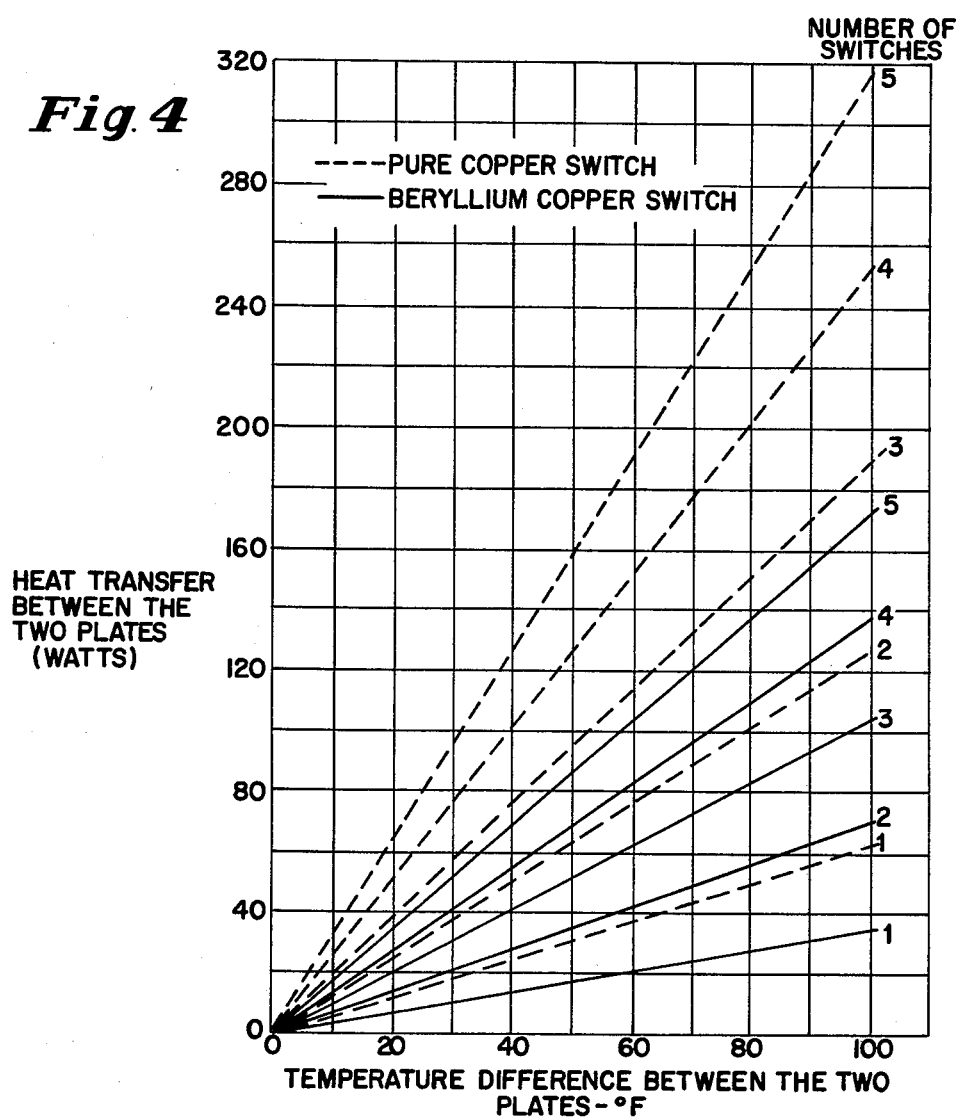
FIG. 4 is a graph of ideal heat transfer characteristics between the electronics package and thermal switches shown in FIG. 3 for various numbers of switches and differing switch materials.

In a typical example, the transfer plate of armature 9 was formed of copper approximately 0.2"-0.3" thick and 2" wide. The gap between plates 3 and 5 was set at approximately 2". Springs 11 and 45 had a tension force of approximately 20 lbs. and piston unit 13 was selected to provide a force of 50 lbs. upon activation at a temperature of 95° F. Compression spring 16 (FIG. 1) was selected to have a force of 5 lbs. The heat transfer characteristics of a device having the foregoing dimensions and parameters are illustrated in FIG. 4. Of course, other switch dimensions and parameters could be substituted for the above to adapt the switch to a particular configuration or use.

Figure 3:
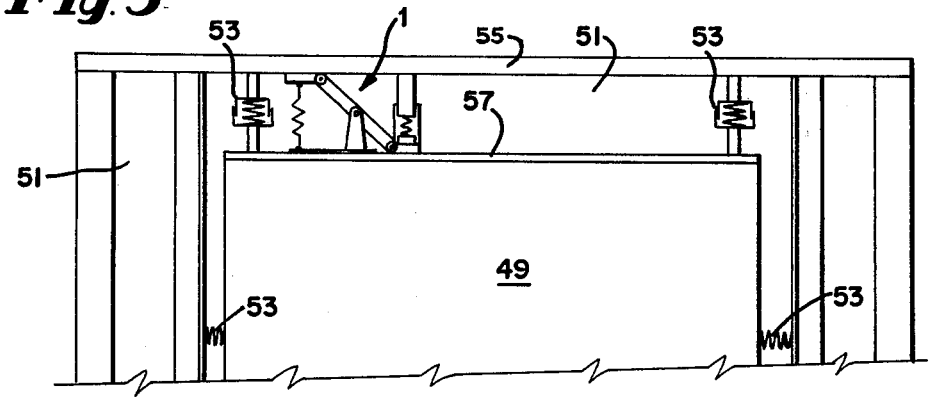
FIG. 3 is a side view of an electronics package and storage compartment showing a typical use for the thermal switches shown in FIGS. 1 and 2.

Plates 3 and 5 function as heat sinks (hot or cold) for collecting or radiating heat from one area or object to another. Normally, plate 3 is exposed to an uncontrolled environment, e.g. outer space. Plate 5 is exposed to an object or area whose temperature is to be controlled by the thermal switch. For example, plate 3 can be a spacecraft outer skin or housing exposed to space. Plate 5 can be a portion of an interior wall defining a volume within the spacecraft, as shown in FIG. 3. Alternatively, plate 5 can comprise a portion of an object whose temperature is to be controlled; such an arrangement may include intermediate heat sinks or other thermally conductive means disposed between the object and the thermal switch.

In FIG. 3, as briefly mentioned above, a typical use for the thermal switch is illustrated. An electronics instrument package 49 (for example a tape recorder) is mounted within an equipment bay 51 of a spacecraft. Electronics package 49 is suspended within bay 51 by a number of shock mounts 53. Shock mounts 53 isolate package 49 from the walls of bay 51 during high vibration conditions, such as during launch, booster separation, and the like. The outer portion of bay 51 is enclosed by a cover plate or housing 55 of the spacecraft. A number of normally-open thermal switches 1 (only one being illustrated in FIG. 3) are disposed between plate 55 and a mounting plate or heat sink 57 attached to electronics package 49.

Normally, the internal temperature of an electronics package must be maintained within a certain temperature range to maintain reliable operation of the electronics circuitry enclosed therein. A tape recorder, such as described, generates around 15 watts of internal heat. During "hot" orbit conditions (i.e. plate 55 fully exposed to the sun) the internal temperature of bay 51 and recorder 49 is readily maintained by a white overcoating applied to the outer surface of plate 55 having a high infrared emissivity ($\simeq 0.86$) and a low solar band absorptivity ($\simeq 0.32$). Thus most of the heat from the sun is reflected before it can reach electronics package 49. Thermal switch 1 remains closed because the temperature of plate 55 exceeds the phase-change temperature of the thermal switch.

During "cold" orbit conditions (i.e., plate 55 in earth shadow or exposed to deep space) it is desirable to maintain the internal temperature of the electronics package 49 above a certain temperature. Since plate 55 has a high infrared emissivity, a considerable amount of heat would be radiated into space by black-body radiation from the electronics package 49 if it were not for the operation of thermal switch 1. When plate 55 cools below the phase-change temperature of switch 1, the switch resumes a normally "open" position. Thus, electronics package 49 is thermally isolated from the outer plate 55 to minimize the heat flow thereto.

As mentioned above, a number of thermal switches can be mounted between the outer plate 55 and heat sink 57, these plates being equivalent to plates 3 and 5, respectively, described with respect to FIGS. 1 and 2. The thermal switches can be arranged in many configurations to allow the thermal transfer characteristics between an object or area and an uncontrolled environment to be precisely controlled.

FIG. 4 is a graph providing convenient design data for estimating how many thermal switches 1 are required to produce a particular amount of heat transfer between the electronics package heat sink 57 and the cover 55 of the equipment bay. The design data of FIG. 4 is for a thermal switch having a transfer plate thickness of 0.2 inches. The dashed lines provide design data for pure copper as the transfer plate material and the solid lines provide the data for beryllium-copper transfer plates. In all cases, conduction through the springs and support structure is ignored. Make-or-break joints (at end portions 21 and 23) on the transfer plate of armature 9 are assumed to have a joint conductance of 300 Btu/hour °R. The use of non-outgassing thermal grease (such as GE G-683) is assumed for all contact surfaces to assure the best obtainable conductivity.

FIG. 4 is a graph of the heat transfer rate between the electronics package heat sink 57 and the cover 55 of the equipment bay (in Watts) as a function of the temperature difference between these two plates. Thus, once the amount of heat that must be dissipated from the interior of the equipment bay 51 is established and an acceptable temperature difference is defined, this graph yields the required number of thermal switches.

The temperature of the cover plate 55 is fixed by the solar constant and by the surface emissivity and absorptivity, in combination with the amount of internal heat that is to be rejected. The thermal switches are closed only for the hot orbit condition. The required cover plate temperature is determined from the following equation:

$$T_{cover\ plate} = \left[ \frac{\alpha \dot{q}_{solar} + \dot{q}_{internal}}{E\sigma} \right]^{\frac{1}{4}}$$

where:
- $\alpha$ = top cover plate solar band absorptivity
- $E$ = top cover plate infrared emissivity
- $\sigma$ = stefan-Boltzmann constant ($0.48 \times 10^{-12}$ Btu/ft$^2$sec°R$^4$)
- $\dot{q}_{solar}$ = solar radiation intensity in near earth space (0.12325 Btu/ft$^2$sec)
- $\dot{q}_{internal}$ = the heat produced internally divided by the cover plate area (Btu/ft$^2$sec)

Once the temperature of cover plate 55 is determined, a maximum temperature for the heat sink 57 is selected and the number of thermal switches to achieve the resulting temperature difference can be determined. The heat sink temperature is limited by the maximum internal temperature tolerable by the payload. The cover plate temperature must always be less than the heat sink temperature such that the net heat flow is from the payload to cover plate 55, for the hot orbit example.

Thus, by the use of the thermal switches, the heat transfer characteristics of a particular spacecraft-payload combination can be established. In addition, the automatic opening of the thermal switches prevents excessive heat rejection to space with consequent exceeding of the lower temperature limit of the sensitive payload item during cold orbit conditions. The switches are completely automatic and relatively "passive" in nature (no external power needed). An extra switch (above the minimum requirement) can be used to introduce a factor of safety. For many payload items, such as the tape recorder described above, the failure of some of the switches to open or close would merely result in a shut-down of the tape recorder system during some portion of the orbit conditions, with a partial (not total) loss of data. The inherent redundancy of using a plurality of thermal switches minimizes the chance of such a shut-down.

Normally, the thermal isolation provided by switches 1 is sufficient to maintain the equipment bay above a desired minimum temperature. However, if necessary, the system can be used in conjunction with internal heaters. In this case, the function of the thermal switches would be to minimize the amount of internal power required to maintain a critical minimum temperature.

The thermal switches of the present invention have several advantages over louvered temperature control systems as used in spacecraft. First, there is no need to open up the equipment bay to a vacuum. Second, the thermal switches can be varied in size, number and arrangement according to the amount of thermal conduction desired. Third, particularly in high vibration environments, the spring-biased pivotally mounted transfer plate of the switch affords a degree of movement of the switch components without affecting the operation of the switch. Fourth, the switch is automatic in operation since it is self-powered by a phase-change power unit which also acts as a temperature sensor.

In addition, the thermal switches of the present invention are simpler in construction and provide more controlled heat transfer characteristics than prior art thermal switches. Both normally "open" and normally "closed" thermal switches can be constructed in accordance with the principles of the present invention. Other uses of the above-described thermal switches, such as in the fields of cryogenics or electronics packaging, will be apparent to those skilled in these arts.

While the automatic thermal switch of the present invention has been described in considerable detail, it is understood that various changes and modifications may occur to persons of ordinary skill in the art without departing from the spirit and scope of the invention as defined in the appended claims.

What is claimed is:

1. A thermal switch for selectively varying the heat transferred between an uncontrolled variable temperature environment and a controlled temperature environment comprising:
    first and second spaced members, respectively having surfaces exposed to said uncontrolled and controlled environments, said members having high thermal conductivities relative to said uncontrolled and controlled environments;
    a heat motor being in heat exchange relationship with said first spaced member; and
    pivotal armature means between said first and second spaced members, said armature means having a relatively high thermal conductivity and having one end thereof coupled to said heat motor, said armature means being responsive to said heat motor so that said armature means is pivoted between first and second positions in response to the amount of heat absorbed by said heat motor from said first spaced member, said armature means being in contact with said first and second spaced members in said first position to provide a high thermal conductivity path between said first and second spaced members, and said armature means being spaced from said first and second spaced members in said second position to provide a substantially low thermal conductivity path between said first and second spaced members.

2. The thermal switch of claim 1 wherein said armature means is normally disposed in said first position with respect to said first and second spaced members, and wherein said heat motor pivots said armature means into said second position in response to a temperature increase in said first spaced member.

3. The thermal switch of claim 1 wherein said armature means is normally disposed in said second position with respect to said first and second spaced members, and wherein said heat motor pivots said armature means into said first position in response to a temperature increase in said first spaced member.

4. The thermal switch of claim 2 including means for biasing said armature means in said first position.

5. The thermal switch of claim 3 including means for biasing said armature means in said second position.

6. The thermal switch of claim 1 wherein said heat motor includes a phase-change power unit coupled between said first spaced member and said armature means.

7. A thermal switch for selectively varying the heat transferred between an uncontrolled variable temperature environment and a controlled temperature environment comprising:
  first and second thermally conductive spaced members, respectively having surfaces exposed to said uncontrolled and controlled environments, said first and second thermally conductive spaced members having high thermal conductivities relative to said uncontrolled and controlled environments;
  a thermally conductive armature disposed between said first and second thermally conductive spaced members;
  means for biasing said thermally conductive armature in a predetermined position with respect to said first and second thermally conductive spaced members; and
  means, in a heat exchange relationship with said first thermally conductive spaced member and coupled to said thermally conductive armature, for driving said thermally conductive armature is response to a detected temperature change in said first thermally conductive spaced member so as to vary the thermal conduction between said first and second thermally conductive spaced members through said thermally conductive armature.

8. The thermal switch of claim 7 wherein said biasing means normally biases the thermally conductive armature in thermal contact with said first and second thermally conductive spaced members, and wherein said driving means drives said thermally conductive armature into a non-contacting position with respect to said first and second thermally conductive spaced members in response to a detected temperature rise in said first thermally conductive spaced member.

9. The thermal switch of claim 7 wherein said biasing means normally biases said thermally conductive armature into a non-contacting position with respect to said first and second thermally conductive spaced members, and wherein said driving means drives said thermally conductive armature into thermal contact with said first and second thermally conductive spaced members in response to a detected temperature rise in said first thermally conductive spaced member.

10. The thermal switch of claim 7, wherein said first thermally conductive spaced member comprises a heat radiating plate and said second thermally conductive spaced member comprises a heat collecting plate.

11. The thermal switch of claim 7 wherein said thermally conductive armature comprises an articulated, thermally conductive heat transfer plate, said thermally conductive heat transfer plate being pivotally attached to a support, said support being mounted to said second thermally conductive spaced member.

12. The thermal switch of claim 11 wherein said thermally conductive heat transfer plate further includes a central portion and first and second end portions connected by hinge means to said central portion, said first and second end portions being disposed in a substantially parallel relationship with respect to said first and second thermally conductive spaced members.

13. The thermal switch of claim 7 wherein said driving means comprises a phase-change power unit, said power unit including a piston-carried plunger coupled to said armature.

14. A thermal switch for selectively varying the heat transferred between an uncontrolled variable temperature environment and a controlled temperature environment comprising:
  first and second thermally conductive spaced plates, respectively having surfaces exposed to said uncontrolled and controlled environments, said first and second thermally conductive spaced plates having high thermal conductivities relative to said uncontrolled and controlled environments;
  a support disposed between said first and second thermally conductive spaced plates, said support being mounted to said second thermally conductive spaced plate;
  a thermally conductive transfer plate pivotally mounted to said support;
  spring means for biasing said thermally conductive transfer plate in a predetermined position with respect to said first and second thermally conductive spaced plates; and
  a phase-change power unit having a first portion in a heat exchange relationship with said first thermally conductive spaced plate and a second portion coupled to said thermally conductive transfer plate, said phase-change power unit driving said thermally conductive transfer plate in response to a detected temperature rise in said first thermally conductive spaced plate so as to vary the thermal conduction between said first and second thermally conductive spaced plates through said thermally conductive transfer plate.

15. The thermal switch of claim 14 wherein said spring means normally biases said thermally conductive transfer plate into thermal contact with said first and second thermally conductive spaced plates, and wherein said phase-change power unit drives said thermally conductive transfer plate into a non-contacting position with respect to said first and second thermally conductive spaced plates in response to a detected temperature rise in said first thermally conductive spaced plate.

16. The thermal switch of claim 14 wherein said spring means normally biases said thermally conductive transfer plate into a non-contacting position with respect to said first and second thermally conductive spaced plates, and wherein said phase-change power unit drives said thermally conductive transfer plate into thermal contact with said first and second thermally conductive spaced plates in response to a detected temperature rise in said first thermally conductive spaced plate.

17. The thermal switch of claim 14 wherein said first thermally conductive spaced plate comprises a heat radiating plate exposed to said uncontrolled environment and said second thermally controlled spaced plate comprises a heat collecting plate exposed to said controlled environment.

18. The thermal switch of claim 14 wherein said thermally conductive transfer plate includes a central portion pivotally attached to said support and first and second end portions connected by hinge means to said central portion, said first and second end portions being disposed in a substantially parallel relationship with respect to said first and second thermally conductive spaced plates.

* * * * *